United States Patent
Pitti

[15] 3,651,627
[45] Mar. 28, 1972

[54] DOUBLE-COMBED MECHANISM WITH ALTERNATE PNEUMATIC OPERATION FOR THE SHAKING OF THE BRANCHES OF THE OLIVE TREES AND THE GATHERING OF ITS FRUITS

[72] Inventor: Corrado Pitti, 36 Sciaia El Mazuni, Tripoli, Libia, Italy

[22] Filed: Sept. 22, 1970

[21] Appl. No.: 74,410

[30] Foreign Application Priority Data

Oct. 11, 1969 Italy .................................. 40712 A/69

[52] U.S. Cl. .......................................................... 56/328 R
[51] Int. Cl. ........................................................ A01g 19/00
[58] Field of Search ................................................ 56/328 R

[56] References Cited

UNITED STATES PATENTS 3,389,543  6/1968  Clark ..................................... 56/328 R
3,418,797  12/1968  Meyerhoffer ......................... 56/328 R Primary Examiner—Louis G. Mancene
Assistant Examiner—J. A. Oliff
Attorney—Bauer & Amer

[57] ABSTRACT

A device for shaking the branches of a fruit-bearing tree and the like having a series of combs, each including a plurality of teeth, the teeth of each series of combs being spaced from the other with an operator for moving arms connected with the series of combs through longitudinally movable carriers for alternately moving each of the series of combs longitudinally in opposite directions to correspondingly articulate the respective teeth to shake the branches free of their fruit.

2 Claims, 3 Drawing Figures

Patented March 28, 1972

3,651,627

INVENTOR
CORRADO PITTI

BY Bauer & Ames

ATTORNEYS

DOUBLE-COMBED MECHANISM WITH ALTERNATE PNEUMATIC OPERATION FOR THE SHAKING OF THE BRANCHES OF THE OLIVE TREES AND THE GATHERING OF ITS FRUITS

The subject invention regards a double-combed mechanism to facilitate the gathering of olives and other fruit from trees with particular configuration of each series of teeth, with the support of each of the series operated pneumatically for a rapid, alternate, longitudinal movement for the purpose of shaking the branches caught between the combs and so cause the olives or other fruit to fall to the ground to be picked with more ease and safety.

The olive tree, as is the case with other plants, does not allow an easy mechanical picking of its fruits, as the same are found hanging on all its branches from the outer to the innermost and from the lowest to the highest branches.

The gathering of the olives is very difficult, not to say expensive, by manual operation; to add to the ease and speed of operation, research has been made to extend ever more the mechanical system, not only to move with ease over terrain, possibly rough, but especially to reach all points of the tree's branches loaded with olives.

Gathering machines for this purpose are already in use in different countries, including Italy, as, for example, a tractor equipped with a hydraulic control arm on the free end of which is mounted a device that operates by vibration or shaking of the branches.

A purpose of this invention is to provide a double-combed mechanism that, set up on the free end of a hydraulic control arm of a conveyance of the type mentioned, simplifies the insertion of the comb arrangement even between the branches, that would otherwise be hard to reach, and to subject the branches so entangled between the teeth to a rapid, alternate movement of a relatively short run longitudinally to the combs, a run that is effected in opposite directions for the two series of teeth of the device.

Another purpose of the present invention is to provide the shape of each series of teeth singly and on the whole, so as to insure enough of a hold on the branches, during the shaking phase, as to guarantee a total drop of the olives hanging on them; said shape to confer also a sufficient elastic characteristic to each tooth and to allow the two combs to operate from up to down, or vice versa, or from the outside to the inside, or vice versa.

A further purpose of this invention is to dispose the teeth of one series substantially in parallel planes to those of the other series, with each plane of one series inserted between two planes of the other, and with an interspace between the contiguous planes of both combs, so as to facilitate the insertion of the same into the innermost areas of the tree.

Yet another purpose of the invention is to confer to the series of teeth of one of the combs a rapid, alternate movement longitudinally by means of pneumatic control, a movement that by appropriate mechanical connection between the supports of the combs passes to the series of teeth of the other comb, but with a longitudinal displacement opposite to that of the first, at all times.

The description that follows, relative to a favorite way of realizing the invention according to the attached plan, will serve to better clarify the principal characteristics of the double-combed device, object of the invention; and from such description and the illustrations, shall be easy for qualified technicians to judge the effective advantages that the device can bring with its practical application, perhaps making modifications deemed useful to the purpose, and that are understood as of now to be part of the same invention if they fall within its informative principles and its ends.

The above description, as well as further objects, features and advantages of the present invention, will be more fully appreciated by reference to the following detailed description of a presently preferred, but nonetheless illustrative, embodiment in accordance with the present invention, when taken in conjunction with the accompanying drawings, wherein.

Figure 2:
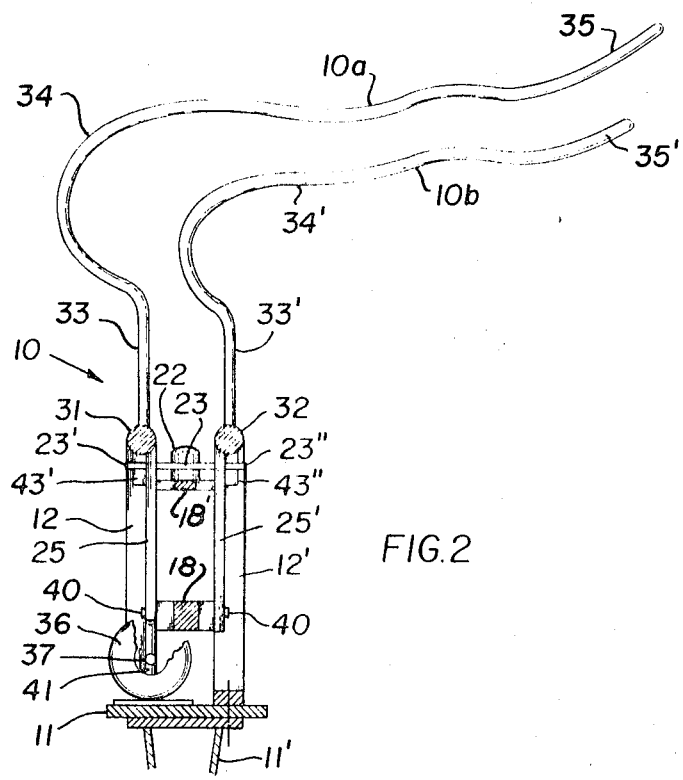
FIG. 2 is a partial view of FIG. 1 at approximately lines II—II with parts of the pneumatic means cut for better exhibition of the device.

According to the description of this feasible outline, the device 10, with the pair of combs 10a, 10b (FIG. 2) for the shaking of the branches of the olive and other fruit trees, is provided with a supporting frame having a base 11 that is needed for the connection at 11' with the free end of a hydraulic control arm of a conveyance appropriate to the gathering of olives (not shown). Rising from the base 11 are shoulders 12, 12' at one end and shoulders 13 at the other that are connected with each other by a pair of traverses 18, 18'.

A series of teeth 29, 30, respectively of the combs 10a, 10b each have their bases joined with the parts carrying respectively 31, 32, which extremities are supported and subject to movement in corresponding holes of the aforementioned shoulders of the frame. According to FIG. 1 and 2 of the drawing, the part 31 has the extremities 31a, 31b, running respectively in holes of the shoulders 12 and 13, while the teeth carrying part 32 has its extremities 32a, and 32b running in the holes of the other two shoulders 12' and 13.

The shape of the series of teeth 29 is such that they have a vertical stroke 33 merging with an arched stroke 34 and extending therebeyond in a zone of long undulations with the free terminal part 35 turned upward. The shape of the teeth of the series 30 is similar, terminating in the part 35'. The dimensions of the series of teeth allow the two zones of long undulations to have a vertical interspace therebetween sufficient to guarantee their introduction between the branches from the top downward, or vice versa, and from the front to the rear of the tree, or vice versa, relying on the elasticity of the teeth and naturally on the shrewdness of the operator so that the operation of shaking the branches will take place without damage to the plant or the device.

The two teeth carrying elements 31, 32 are subject to rapid, alternate longitudinal movement with the help of appropriate articulations and with the control of a conventional pneumatic means 36. The means 36 may be a conventional apparatus of a type like a pneumatic hammer which allows for a rapid regulated alternating opening and closing movement of the mobile stem 37, usually over a thousand strokes per minute.

The articulation for the control and the rapid, alternate longitudinal movement of the comb 10a is constituted by an ear 38 jutting from the lower teeth-carrying base 31, furnished with a hole run through with a pivot 39 on which is hinged the extremity of an arm of lever 25, which other extremity is hinged on another fixed axis of rotation in 40. The other arm 41 of said lever is that which receives the command of movement from the stem 37, while a spring 42 forces the lever to return to its original position when the thrust of 37 against 41 stops. On the same teeth carrying element 31 another ear 43 similar to 38, with pivot 44, and the arm 26 mounted at one extreme on a fixed pin and at the other on said pin 44, will create an articulated system for the needed rapid, alternate longitudinal movement of the entire comb 10a.

Mounting and articulations are similar for the comb 10b, with only the difference that here is lacking the lever arm corresponding to 41, previously indicated. This because it was preferred in this feasible outline, to make the pneumatic control, with its stem 37, to work only on the lever arm 41, relative to the front comb 10a, as per FIG. 1, and transmit the movement to the rear comb 10b making use of an auxiliary lever 23, which arms 23' and 23" have the free extremities capable to follow, or command, the movement of the teeth carriers 31 and 32. This action of the arms 23', 23" is feasible in this instance by pivoting the lever 23 at 22 on the traverse 18' and providing radial grooves in the extremities of the same arms and into which are inserted pins 43', 43" projecting downward respectively from the teeth carriers 31 and 32.

Figure 3:
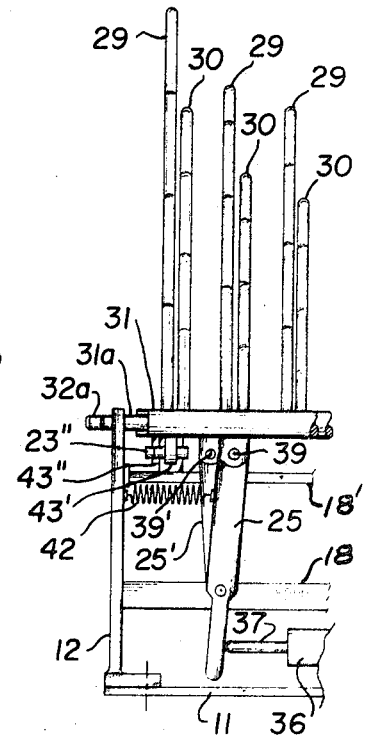
FIG. 3 is a partial front view of FIG. 1 showing the two series of combs and their respective displacement levers at the end of the stroke of each of them.

In this manner, when the arm 41 is subject to the action of thrust of the stem 37 of the pneumatic control 36, and there is the return of the arm 25 of the same lever by means of the spring 42, the teeth-carrier will move longitudinally in a rapid, alternate manner, and the teeth-carrier 32 and then the other comb 30, will be subject also to rapid, alternate movement. At all times, the direction of displacement of one comb will be opposite to that of the other, as is evident in FIG. 3. In the stage of rest, the position of the teeth 30 of the comb 10b can preferably be considered intermediate among the neighboring teeth 29 of the comb 10a, as illustrated in FIG. 1.

Figure 1:
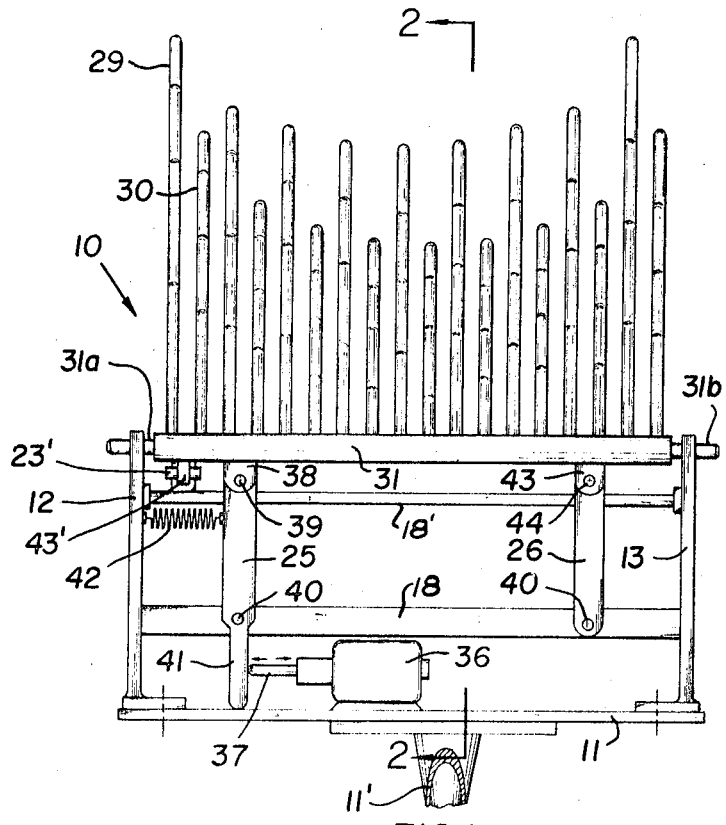
FIG. 1 is a schematic front view of a double-combed device, shaker-harvester for olives and the like according to a feasible form of the invention and with the teeth in their median positions of their relative strokes; the device is shown with a base for attachment to the hydraulic control arm of a tractor, and with a pneumatic means to create rapid, alternate movements of one of the combs.

From this same FIG. 1 can be seen that the height of the teeth of each comb 10a, 10b has a value such as to cause each series to assume a concave shape. This has been useful in the tests carried out, as has been found useful a ratio of about 1:4 between the functional lengths of the lever arms 41 and 25, so that a small movement created by the pneumatic means on the arm 41, which in practice can be considered of about 4 mm. for the free end of the stem 37, there will be corresponding movement of about 15 mm. of the other comb in the opposite direction to the end of each run. To such movement of 4 mm. of the free extreme end of the stem, there will be a corresponding total opening of about 30 mm. between the contiguous teeth of the two series.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:
1. A device for shaking the branches of olive trees comprising
   a frame having a base including means to fasten the same to a conveyance,
   shoulders mounted on said base,
   a plurality of carriers on the extremities of each shoulder,
   a plurality of series of combs each having a plurality of elastic elongated undulating teeth shaped to penetrate between the branches of an olive tree,
   each of said series of combs being mounted on the respective one of said carriers with the teeth of one of said combs substantially in parallel planar relation with the teeth of another of said combs and with the teeth of one series of combs being between the teeth of another of said series of combs,
   pivoted lever means connecting said carriers for alternate longitudinal movement in opposite directions to correspondingly articulate the respective combs mounted thereon,
   moving means to pivot said lever,
   means operable to move said moving means,
   and each tooth is provided with a vertical part merging with a curved part and extending therebeyond to a wavy part that terminates in an upward turned end part,
   said wavy parts of the teeth of each series of combs being vertically spaced in respect to those of the teeth of the other series of combs.

2. A device as in claim 1, said moving means including an arm pivoted at one end to a respective one of said carriers to move its respective carrier and lever to one position in its longitudinal movement and pivoted at a fixed point on said device spaced from said one end,
   means urging one of said arms into one position of pivoted movement and said operable means operating said one of said arms in opposition to said urging means to operatively move said one arm to an opposite position in its longitudinal movement.

* * * * *